United States Patent [19]

Tuy et al.

[11] Patent Number: 5,297,043
[45] Date of Patent: Mar. 22, 1994

[54] RAPID DISPLAY OF ROTATED AND TRANSLATED THREE DIMENSIONAL IMAGE REPRESENTATIONS

[75] Inventors: Heang K. Tuy, Chesterland; Todd J. Krochta, Copley, both of Ohio

[73] Assignee: Picker International, Inc., Highland Hts., Ohio

[21] Appl. No.: 597,191

[22] Filed: Oct. 15, 1990

Related U.S. Application Data

[63] Continuation-in-part of Ser. No. 391,484, Aug. 8, 1989, Pat. No. 5,079,699, which is a continuation-in-part of Ser. No. 200,697, May 31, 1988, abandoned, and a continuation-in-part of Ser. No. 126,368, Jan. 27, 1987, abandoned.

[51] Int. Cl.$^5$ .............................................. G06F 15/42
[52] U.S. Cl. .................................... 364/422; 395/127
[58] Field of Search ............... 395/123, 127, 125, 119, 395/924, 134, 137, 155, 124; 340/728; 364/413.22, 413.21

[56] References Cited

U.S. PATENT DOCUMENTS

4,982,345  1/1991  Callahan et al. ..................... 395/134

FOREIGN PATENT DOCUMENTS

380459A2  8/1990  European Pat. Off. .

OTHER PUBLICATIONS

"Boeing Graph User's Guide Version 4", Sep. 1987, pp. 103-128.
"Representation, Manipulation and Display of 3-D Discrete Objects", Tuy Proceedings of the 16th Annual Hawaii Int'l. Conf. Sys. Sci. 1983, pp. 397-406.

*Primary Examiner*—Gail O. Hayes
*Attorney, Agent, or Firm*—Fay, Sharpe, Beall, Fagan, Minnich & McKee

[57] ABSTRACT

A C.T. scanner (A) or other medical diagnostic imager generates volume image data which is stored in an image memory (B). An image memory access controller (30) withdraws selected pixel values from the volume image memory which it provides a video processor (20) to formulate the appropriate video signals for display on a video monitor (C). An operator defines a volume on an operator controller (32). A plurality of interconnected polygons define the three-dimensional volume specified by the operator. The video processor converts these defined polygons into an appropriate display on the monitor. The polygons are selected to define a subregion to be viewed. The polygons are rotated about one or more of (x), (y), and (z) axis, scaled, and translated along these axis to select an orientation from which the polygon and enclosed data is to be viewed. The rotation, scaling and translation is stored (38, 40, 42). From each pixel interior to the projection of a visible polygon onto the screen, the coordinates of a sample in the polygon are calculated via the inverse of the stored rotation, scaling, and translation. The CT value of sample and that of its neighbors are retrieved, interpolated, weighted with the surface gradient and illuminated on the screen. The polygons are compared and hidden surfaces removed (54). Retrieved pixel values that correspond to air or other tissue that is not to be viewed rather, the access control means continues to step along the translated and rotated viewing direction ray until a pixel value is found which meets the air and non-viewed tissue viewing criteria (62). For a more lifelike image, shading is added (64) to data corresponding to one or more of the polygons.

22 Claims, 3 Drawing Sheets

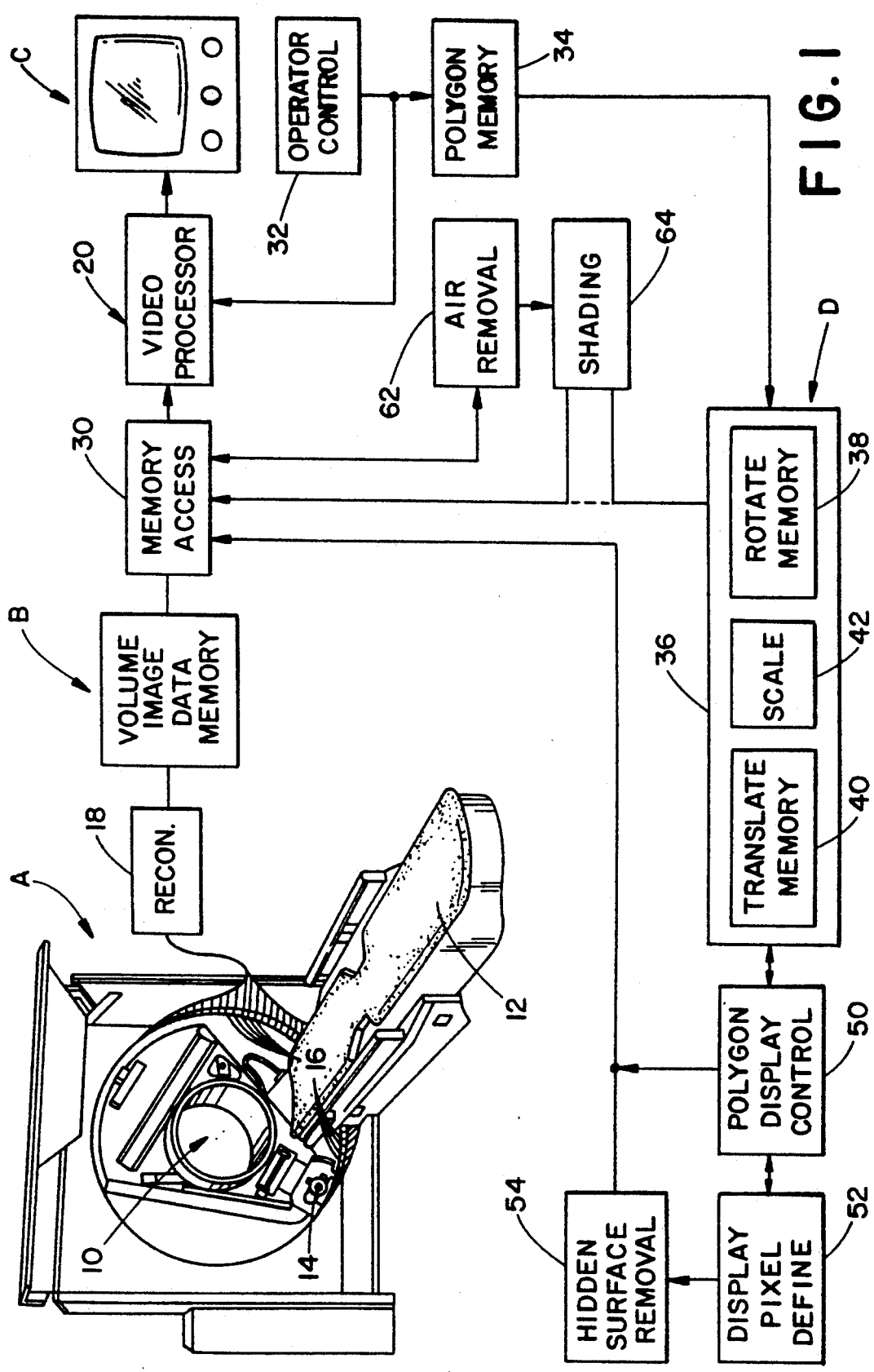

RAPID DISPLAY OF ROTATED AND TRANSLATED THREE DIMENSIONAL IMAGE REPRESENTATIONS

This application is a continuation-in-part of patent application Ser. No. 391,484, filed Aug. 8, 1989, now U.S. Pat. No. 5,079,699 which in turn is a continuation-in-part of application Ser. Nos. 200,697, filed May 31, and 126,368 filed Nov. 27, 1987 now abandoned.

BACKGROUND OF THE INVENTION

The present invention relates to image data manipulation. It finds particular application in conjunction with the three dimensional presentations of computerized tomographic image data and will be described with particular reference thereto. However, it is to be appreciated, that the invention will also find application in conjunction with the display of medical diagnostic image data from other imaging modalities, as well as to images from numerous non-medical applications.

Heretofore, CT scanners have irradiated a planar region of a subject from various angles and detected the intensity of radiation passing therethrough. From the angle and radiation intensity information, two dimensional image representations of the plane are reconstructed. A typical image representation includes a 51233 512 pixel array, although smaller and larger arrays are known. In a black and white image, each pixel has a corresponding value or number which is indicative of the gray scale to be displayed at that pixel. For three dimensional imaging, a plurality of slices are generated, e.g. 60 closely adjacent parallel slices, each of which is represented by a 512×512 array of pixel values. The pixel values of the multiple slices are treated as a 512 ×512×60 pixel array or three dimensions of image data. Various planes or other surfaces can be defined through the three dimensional data and displayed.

However, viewing a three dimensional object as a series of slices is not natural. Considerable training on the part of the radiologist is required in order to integrate the stack of CT images mentally. Other medical professionals, such as surgeons, who are not trained as radiologists have difficulty performing the mental integration necessary to conceptualize the three dimensional appearance of the object represented by a stack of slice images. Accordingly, techniques have been developed for presenting a three dimensional presentation which allows the inspection of the object along any cutting plane in a natural fashion.

Generally, such three dimensional presentations include a display of only the extended surfaces which a viewer would see and an internal part of the object through the cut of the object by an appropriate plane or surface. To create the illusion of depth, the angle of the tangent to the surface at each point is estimated and shading is added in accordance with the angle of the surface tangent relative to a preselected illumination point. In a black and white CT image, the shading is added by increasing the brightness or whiteness of each pixel value in proportion to how nearly perpendicular it is to the light source and by increasing the black scale in proportion to the degree that the tangential surface faces away from the light source. For example, a gray scale value that is proportional to the sine/cosine of the angle between the tangent surface and the light source may be combined with each pixel value.

To generate the pixel values for display, every pixel value of the three dimensional data was examined. Each data value was examined to determine whether or not it shows in the resultant image. Each data value which does show is assessed relative to the other data values to determine what contribution, if any, it makes to the image. None could be readily dismissed as not showing. Specifically, air produces a pixel value characteristic of black. Because air is transparent to the viewer, values from pixels hidden behind pixels whose values were indicative of air show through, hence must be displayed. Analogously, other types of tissue that have characteristic pixel values or CT numbers could also be defined as transparent and removed from the view semi-transparent, or the like. Hence, the location of the pixel within the data alone was not determinative of whether or not the pixel value would show in the image. Rather, each pixel value had to be considered in the context of its surrounding pixels. This was computationally very time consuming. Note that a 512×512×60 pixel data set contains almost sixteen million pixels. Various tricks have been developed, many of which are application specific for trying to reduce or identify a subset of all available pixels to project up to the cutting surface or viewing screen to determine their contributions.

Once the three dimensional presentation is displayed on the screen, it often proved advantageous to view it from a different direction. For example, a critical surface portion may be partially obscured or it may be necessary to see the backside before starting surgery. For the new viewing direction, the entire process was repeated anew. Effectively, all of the data within the three dimensional volume was rotated to the appropriate orientation relative to the viewing screen, and the contribution of each pixel was projected up to the plane of the screen for reassessment. In the prior art, all of the data was rotated or shifted to achieve the proper location of the screen relative to the data before the data was projected up to the screen. The shifting of almost sixteen million pixels of data and the interpolation of data, where necessary, further increased processing time.

SUMMARY OF THE INVENTION

In accordance with the present invention, a new and improved technique is provided for generating three dimensional image presentations.

In accordance with one aspect of the present invention, surfaces of a portion of the object to be displayed are projected onto the screen in order to assess which pixels are to be illuminated during the image presentation.

In accordance with another aspect of the present invention, surfaces of a selected volume are defined, e.g. by the corners of polygonal surfaces. When the selected data is to be viewed from a different direction, the polygonal surfaces are rotated, scaled, translated, and projected onto the screen not the underlying volume of data. Only those samples of the underlying data that give rise to pixels within the projections of the visible polygons are retrieved, processed and displayed.

In accordance with a more limited aspect of the present invention, each defined subvolume surface is projected parallel to the viewing direction into the data to retrieve, and where appropriate interpolate or weight the data which corresponds to each point on the defined surface.

More specifically to the preferred embodiment, surfaces of a three dimensional volume to be viewed are defined. The volume is effectively rotated or translated by redefining the coordinates of the corners of each polygonal surface to correspond to a projection onto the screen. The rotation, scaling, and translation are recorded. Thereafter, each pixel on the screen that is contained within one of the projections of a visible polygon is retraced back to the three dimensional data through the stored rotation, scaling translation algorithm.

In accordance with a more limited aspect of the present invention, both a pixel number and an angle of the viewed surface are determined for each display pixel. With this information, appropriate shading for a three dimensional looking presentation may be added, as is known in the art.

In accordance with another aspect of the present invention, a hidden surface removal technique is applied on the polygonal surfaces of the defined volume before the data is retrieved through the translation, scaling, and rotation algorithm. In this manner, hidden surfaces are removed efficiently based on the defined volume without accessing the data.

In accordance with another aspect of the invention, if the slices are homogeneous, the visibility of the polygons is determined by checking normals to the polygons.

In accordance with another aspect of the present invention, the display carries two types of information. For example, an exterior surface of a selected organ is displayed in a preselected intermediate gray scale adjusted for shading and a slice through the organ is displayed in CT numbers or gray scale corresponding to the CT numbers.

In accordance with another aspect of the present invention, an apparatus is provided which includes means for performing each of the above referenced steps.

One advantage of the present invention is that it expedites the display of three dimensional image data presentations. Another advantage of the present invention is that it reduces the number of computer processing steps and data manipulations.

Another advantage of the present invention is that it facilitates changing the viewing angle to view the selected object from a different direction or perspective.

Still further advantages will become apparent to those of ordinary skill in the art upon reading and understanding the following detailed description of the preferred embodiments.

BRIEF DESCRIPTION OF THE DRAWINGS

The invention may take form in various steps and arrangements of steps and in various components and arrangements of components. The drawings are only for purposes of illustrating the preferred embodiment and are not to be construed as limiting the invention.

FIG. 1 is a diagrammatic illustration of a CT scanner system in accordance with the present invention;

DETAILED DESCRIPTION OF THE PREFERRED EMBODIMENTS

Figure 3C:
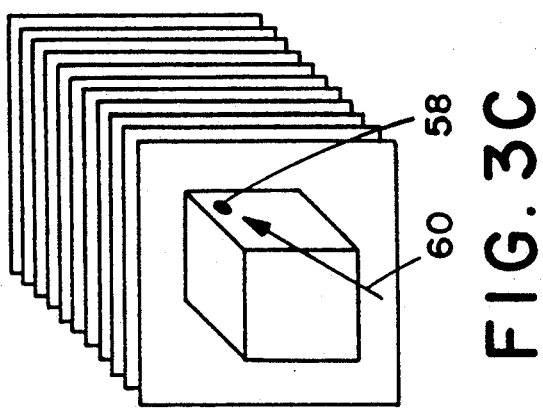
FIG. 3C illustrates the selected volume superimposed on the image data.

With reference to FIG. 1, a non invasive examination apparatus A non-invasively examines the interior of a subject and generates data indicative of a three dimensional volume thereof. An image memory means B stores the three dimensional image data for display on a video display terminal c. A three dimensional representation processing means D processes the image data to generate a three dimensional like presentation of all or a selected portion of the data on the two dimensional display means 0.

The three dimensional image supply means A in the illustrated embodiment is a non-invasive medical diagnostic apparatus, particularly a CT scanner. However, other sources of three dimensional image data in the medical imaging field, such as magnetic resonance imagers, and outside the medical imaging field are also contemplated. The non-invasive medical diagnostic apparatus includes an examination region 10 for receiving the subject supported on a patient couch or support 12. An irradiating means 14, such as an x-ray tube, magnets, or radio frequency coils, irradiate the patient. A radiant energy receiving means, such as radiation detectors, radio frequency receiving coils, or the like, receive medical diagnostically encoded radiant energy. In the illustrated CT scanner example, the source of radiation energy is an x-ray tube which generates a fan-shaped beam of x-rays. The fan-shaped beam of x-rays passes through the subject in the examination region 10 impinging upon the radiant energy detection means 16, specifically a ring of x-ray detectors The x-ray tube 14 is mounted for rotation by a motor other rotating means about the examination region such that the patient is irradiated from a multiplicity of directions. The radiation detectors are positioned either in a stationary ring surrounding the examination region or in an arc which rotates with the x-ray tube to receive the radiation that has traversed the patient.

An image reconstruction means 18 reconstructs an image representation from the received radiation. For example, the image reconstruction means may reconstruct a 512×512 array of pixel values, each pixel value being representative of a radiation transmissive property of a corresponding volumetric region or slice of the patient. To generate three dimensional image data, the patient couch is indexed longitudinally to generate a plurality of slices of image data. Optionally, a wider x-ray beam may be generated and a plurality of rows of detectors may be provided such that a plurality of slices are generated concurrently. For purposes of illustration, the preferred embodiment is described below as generating 60 slices of 512×512 data. However, it is to be appreciated that the present invention is generic to other volumetric sizes such as 256×256 pixel slices, 1024×1024 pixel slices, and volumes of symmetric and non-symmetric configuration in all dimensions.

Figure 2:
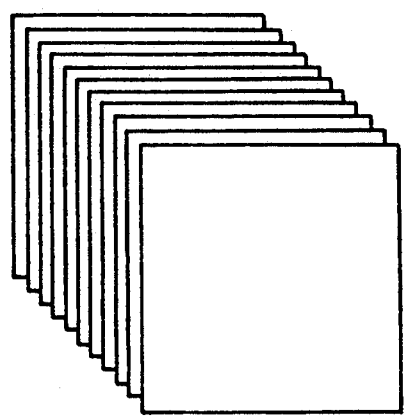
FIG. 2 is a diagrammatic illustration for conceptualizing the stored three dimensional data and the planar images conventionally available therefrom.

The image memory B stores the image data in a manner that can be conceptualized as illustrated in FIG. 2 as p planes of m×n data. In this manner, pixel values representing a regular distribution over an imaged volumetric region are generated and stored. For example, the pixel values may be triply subscripted variables, such that the corresponding pixel value is accessible based on its x, y, z spatial position in the volume. Conventionally, any of the p planes of data can be readily withdrawn from the memory, converted to a video signal by a video processor means 20 and displayed on the video monitor C.

The three dimensional presentation of processing means D includes an image memory accessing means 30 for accessing selected pixels or memory cells of the image memory B. To withdraw a conventional slice image, the memory access means would access each of the memory cells or pixels in a selected slice in an order analogous to the sweep pattern of the video display. The image memory access means 30 supplies the accessed data with necessary address information to the video processor means 20 such that the data is converted into an appropriate video signal for display on the video display monitor C.

Figure 3B:
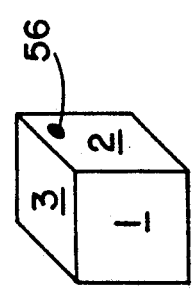
FIG. 3B illustrates the selectable volume with hidden surfaces removed.
Figure 3A:
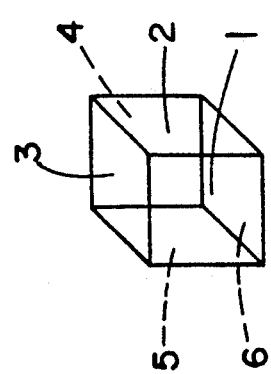
FIG. 3A illustrates an exemplary selectable volume within the image space.

With reference to FIG. 3A, an operator control panel 32 is used by the operator to select the boundaries of a volumetric subregion to be displayed. In the illustrated embodiment, the subregion is a cube which is defined by eight points or corners, which define six surfaces 1, 2, 3, 4, 5, 6. Each surface is defined by its four corners, with two corners being common to each pair of adjacent surfaces. Of course, surfaces with more or less than four corners may also be defined as may some surfaces in excess or less than six. Moreover, the surfaces need not be flat. For example, a spherical surface or a cylindrical surface might be defined. Moreover, the volume may have other appending volume areas e.g. volumes configured to encompass two different modes of scans.

The operator control panel 32 has the appropriate keys, joy stick, or track ball arrangement for the operator to define the volume of interest and cause it to be displayed on the screen of the video terminal. Moreover, the video processor selectively superimposes the selected volume on the slice or other image data withdrawn from the image memory by the image memory accessing means 30. As the operator defines the polygons or other surfaces of the volume, the corners or other distinguishing characteristics are stored in polygon or volume surface memory means 34.

Taking the plane of the screen as a reference origin, the operator control panel enables the operator to rotate the selected volume about any one or more of x, y, and z orthogonal axes, or other axes as may appropriately be defined. A position change algorithm memory means 36 records the algorithm which corresponds to the operator input describing the changes in position of the selected volume, such as rotational and translational repositioning, and any change in scale. A rotational algorithm memory means 38 stores the relative angular rotation about each of the three axes. A translate memory means 40 stores the relative translational movement or shifting along each of the x, y, and z or other preselected axes. A scaling memory means 42 stores relative changes in scale or size. Although the repositioning algorithm means is described in terms of orthogonal coordinates, it is to be appreciated that the position algorithm may be recorded in terms of cylindrical coordinates, spherical coordinates, or the like.

As the control 32 rotates, scales and translates the selected volume, the video processor 20 continues to cause the video display C to display a three dimensional presentation of the volume, i.e. a projection of the polygons which define volume as currently reoriented onto the screen. A polygon display control means 50 controls the video processor 20 to alter the display of the superimposed polygons which represent the volume to match the operator controlled rotation and translation. When the polygons which represent the volume have been positioned to the operator's satisfaction, a display pixel defining means 52 projects, only the corners of the visible polygons representing and encompassing the volume onto the screen. The display pixel defining means creates a list of viewing screen pixels interior to the projection of the polygons from the projected corners displayed on the viewing screen. Each pixel of the list is inversely rotated, scaled, or translated in order to find the appropriate sample of the volume to be displayed. For a set of homogenous slices, a simple check of the normal to the polygon suffices to determine the visibility of the polygon at a given view. In this manner, the pixel defining means 52 defines only the pixels of each surface which will appear on the screen. Of course, some surfaces will not appear at all in the display. The defined volume with the hidden surfaces removed is conveyed to the video processor 20 for display on the volume as illustrated in FIG. 3B.

The coordinates of the samples in the defined volume which give rise to pixels interior to the projection of a visible polygon are calculated through the algorithm means 36 in reverse. For example, with reference to FIGS. 3B and 3C, the coordinates of an exemplary point 56 are translated, scaled, and rotated by algorithm means 36 in reverse to identify a corresponding point 58 in the data and a viewer projection direction 60. The CT number of the sample to be displayed on the screen is retrieved from the volume image data memory B, weighted or interpolated with the CT number of other neighboring samples.

An air removal means or routine 62 identifies those addressed pixels in the image volume which represent air or other selected tissue types which are not to be displayed. If the pixel value is representative of air, the data accessing means 30 is caused to step one step in the viewer projection direction, e.g. the direction perpendicular to the viewing screen, further into the image data and retrieve the next corresponding pixel. This pixel is again compared with the air or other preselected tissue values to determine whether it is to be displayed or not. This process is iteratively repeated until a memory cell or pixel value of the appropriate range to be displayed is located. This process is repeated for each display pixel value that falls within one of the polygons or other surfaces of the defined volume and the corresponding memory cell or pixel value is retrieved by the image memory access means 30. The tangent to the surface at each pixel is determined by comparing the coordinates of the data value retrieved for display with the coordinates of the data values retrieved for display at neighboring pixels.

For a more lifelike or realistic three dimensional presentation, a shading means or routine 64 provides shading values to each pixel. More specifically, an angle or position of illumination origination is defined. Rays are projected from the point of the illumination source to the defined volume,, with the air or other selected tissue removed. The retrieved pixel value is made darker or lighter in accordance with the distance and surface tangent relative to the light source. Surfaces which are obstructed from the light source by other surfaces are shaded most darkly. The degree of shading which is added may be selectively adjustable from the control panel which can be conceptualized as brightening or darkening the illumination source. Similarly, the illumination source can be repositioned and the shading process repeated in order to illustrate other parts of the displayed object better.

All of the surfaces need not be displayed in the three dimensional presentation with shading or with a CT number. Rather, the shading routine may be performed on a surface by surface basis. With reference to FIG. 3D, an additional plane 7 may be defined through the selected volume. For example, the originally defined volume may box the patient's kidney and all air and non-kidney tissue may have been removed by the air removal means 62. The operator may now define the additional plane 7 through the selected volume, i.e. through the kidney. The coordinates of the defined polygon are again processed through the rotation and translation algorithms to define the points in the image memory corresponding to each point on the defined surface. The points on this surface may be displayed either with the shading routine, or with the air removal and shading means may be turned off so that the kidney tissue along this plane is displayed as a slice through the kidney. That is, the data along plane 7 may be displayed as in the conventional slice image format. In this manner, a surgeon can view an organ or portion of the body from its exterior with a three dimensional presentation in order to obtain an accurate perspective on the organ. Once the organ is identified and displayed, the surgeon may take one or more slices through the organ to locate internal tissue information that is significant to the procedure to be performed.

It is advantageous to map the display with shading and the display with CT number of different surfaces into two non-overlapping intervals of the dynamic range of the video memory of the display device C. The separation of the range of values will allow the user to alter the look of one surface characteristics without affecting the look of the other. With this scheme of display, a pleasant or natural look of the entire image can be achieved.

Figure 3E:
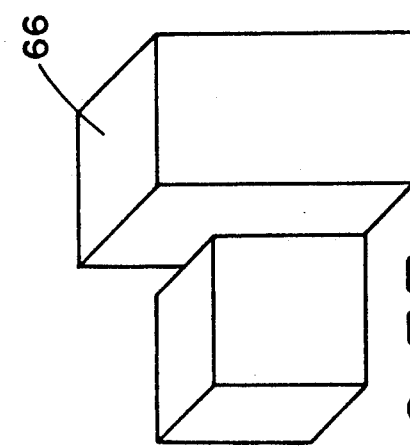
FIG. 3E illustrates a more complex selected volume.
Figure 3D:
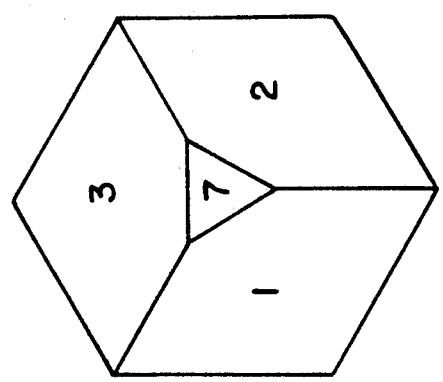
FIG. 3D illustrates the selected volume with section sliced off.

With reference to FIG. 3E, an additional volume 66 may analogously be added contiguously to the first volume. The hidden surface removal means 54 removes surfaces of one volume hidden by the other. Analogously, the data collected and stored in the image memory may represent a volumetric area other than a square volume. For example, part of the data may be taken with the CT scanner entry vertical and another portion with the CT scanner gantry inclined at an angle. Analogously, the height of the patient couch, the reconstruction field size, and other imaging parameters may be adjusted between the collection of the two or more portions of the data.

Figure 4:
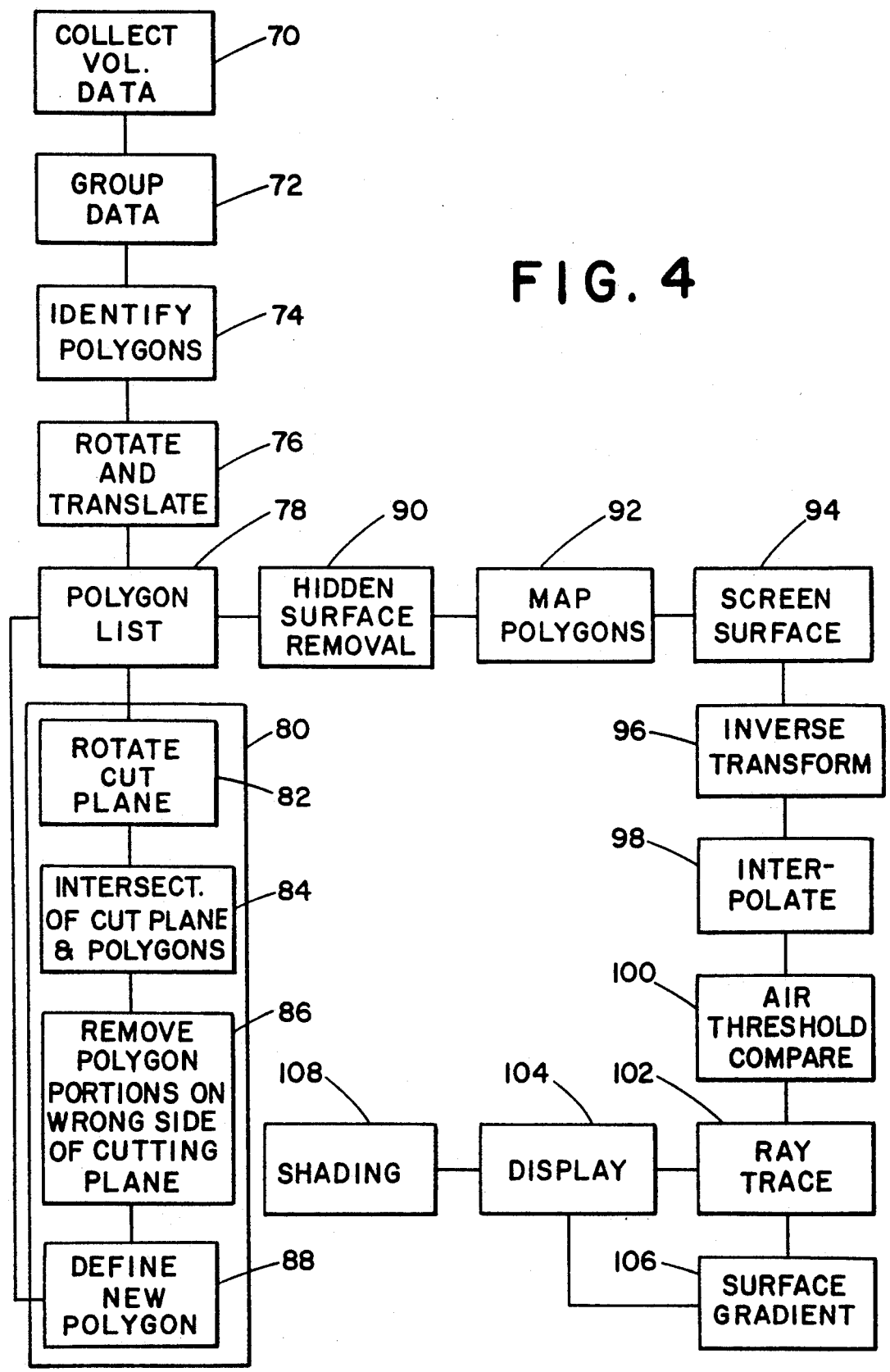
FIG. 4 is a flow chart illustrative of the data processing steps of the preferred embodiment.

With reference to FIG. 4, imaging data representative of a volumetric area of a subject is collected in a step or means 70 using conventional data acquisition and reconstruction techniques. The data is divided or broken into groups of homogeneous slices by a grouping step or means 72. That is, data collected with a different reconstruction field size, couch height, couch increment, gantry tilt, or the like are separated into contiguous, overlapping, or non-contiguous groups. For each group or a subregion thereof, a step or means 74 identifies the bounding polygons or other surfaces of the selected volume. The identified bounding polygons are rotated, scaled, translated, and projected onto the image space, to preselected orientation by a rotation, scaling, and translation step or means 76 and placed in a polygon or surface list 78.

A step or means 80 loops through oblique user defined cutting planes. More specifically, a step or means 82 rotates the cut plane, if necessary. A step or means 84 defines intersections of the cutting planes with the previously defined planes in the polygon list 78. A step or means 86 alters planes in the polygon list to remove parts of the polygons on the wrong side of the user defined oblique cutting plane. The cutting of the object by a plane is done be intersecting the cutting plane, e.g. surface 7, with the polygons, e.g. surfaces 1–6, encompassing the volume. The resulting volume is again a volume bounded by a set of polygons, e.g. FIG. 3D. It is appreciated that fast calculations of the resulting volume can be achieved through this cutting procedure. A step or means 88 adds the new polygon defined by the cutting plane to the polygon list 78 if visible.

A hidden surface removal step or means 90 examines the polygons in the list 78 to remove all or portions of polygons which represent hidden polygon surfaces. A mapping means 92 loops through each of the visible polygons and maps each corner of each visible polygon onto a screen surface 94. For every pixel of the screen interior to the projection of a visible polygon, an inverse transform means 96 transforms the pixel coordinates by performing the rotate, scaled, and translate steps 76 in reverse to locate the corresponding sample in the volume data. Frequently, the discrete points of the image data do not fall precisely on the defined surface. An interpolating step or means 98 interpolates the actually collected data points which are nearest neighbors to the projected point.

A comparing means 100 compares the retrieved or interpolated image data value with a preselected threshold, e.g. the threshold value for air or a tissue type which is not to be viewed. If the threshold is not met, a ray tracing step or means 102 continues to trace the projection backward or deeper into the three dimensional image data until data which meets the threshold criteria is located. The appropriate interpolated image data value determined directly or by the ray tracing step or means is stored in a corresponding memory cell of a display image memory means 104. A surface gradient means or step 106 identifies the slope of the surface corresponding to each point in the display image memory 104 and stores a corresponding surface angle and orientation identification in conjunction With the interpolated pixel value. A shading means or step 108 adjusts each pixel value in accordance with the gradient information in order to make surfaces which light source would strike most directly brighter and sources which are at an angle to the light source darker.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method of generating a three dimensional image presentation comprising:

a) storing image data indicative of a three dimensional volume;

b) defining a region of the volume by defining at least one surface;

c) projecting coordinates of the defined surface onto a viewing screen which viewing screen has a pixel array on which the projection of the surface coordinates is displayed;

d) rotating the projection of the surface coordinates on the viewing screen to select a different view angle and storing the rotation;

e) for each pixel within the rotated projection of the surface coordinates on the viewing screen projecting a ray into the image data along the stored view angle at least to the defined surface and retrieving a corresponding image pixel value;

f) displaying the retrieved image pixel values at the corresponding pixels of the viewing screen in a human-readable display.

2. The method as set forth in claim 1 wherein the step of defining the regions includes defining a plurality of surfaces.

3. The method as set forth in claim 2 further including determining which surfaces portions are hidden from view from a plane of the viewing screen by other surfaces and repeating the surface coordinate projecting steps for each non-hidden surface portion.

4. The method as set forth in claim 3 wherein the step of determining hidden surface portions includes comparing normals to each surface.

5. The method as set forth in claim 3 wherein the defining step includes defining at least two regions, each region being defined by a plurality of surfaces.

6. The method as set forth in claim 3 wherein each of the surfaces is a planar polygon.

7. The method as set forth in claim 3 further including selectively increasing and decreasing brightness of the image pixel values to create the appearance of shading.

8. The method as set forth in claim 3 further including determining a surface contour of a structure in the region corresponding to each image pixel value and altering the brightness of each pixel in accordance with the surface contour.

9. The method as set forth in claim 3 wherein the displaying step includes displaying only image pixel values corresponding to rays that intersect the non-hidden surface portions.

10. The method as set forth in claim 1 wherein the ray projecting step includes:

comparing each image pixel value along the ray with a threshold criteria;

in response to the compared image pixel value, failing to meet the threshold criteria, projecting deeper into the image data until an image pixel value which meets the threshold criteria is found.

11. The method as set forth in claim 1 further including translating the projection of the surface coordinates and storing the surface translation and wherein the ray projecting step includes projecting the ray along a path offset in accordance with the stored translation.

12. The method as set forth in claim 1 further including defining a cutting plane through the region by defining points of intersection between the cutting plane and the region and wherein the displaying step includes displaying the image data values that fall on the cutting plane and within the defined region.

13. The method as set forth in claim 1 wherein displayed image pixel values corresponding to image data which lie off the defined surface are modified to display only information indicative of a surface contour of a structure in the region.

14. The method as set forth in claim 13 wherein the image pixel values corresponding to image data that lie on the defined surface and the data image pixel values corresponding to image data that lie off the defined surface are displayed in different ranges in order to modify a look of a part of the display within affecting the look of the other part of the display.

15. A method of generating a three dimensional image presentation on a two dimensional viewing screen, the method comprising:

storing image data indicative of a three dimensional volume;

defining a plurality of connected polygons which define a three dimensional region of interest within the three dimensional volume;

altering coordinates of the polygon to represent at least one of a rotating, scaling, and translating the polygon relative to the viewing screen;

storing an indication of the rotation, scaling, and translation of the polygon;

projecting at least vertices of visible ones of the polygons on the two dimensional viewing screen in accordance with the stored rotation, scaling and translation;

for each pixel on the viewing screen within the projected visible polygon coordinates, projecting a viewing ray into the stored image data in the three dimensional region of interest with a ray direction, an inter-ray spacing, and a ray offset indicated by the stored rotation, scaling, and translation, and retrieving a corresponding point in the stored image data.

16. The method as set forth in claim 15 further including comparing each retrieved pixel value from the image data with a threshold and in response to the pixel value failing to meet the threshold, projecting deeper into the image data along the viewing ray.

17. The method as set forth in claim 15 further including adjusting at least some of the pixel values to provide a shading effect.

18. The method as set forth in claim 17 further including defining an additional polygon to modify the region of interest, projecting the additional polygon onto the viewing screen, for each point within the projection of the additional polygon on the viewing screen, projecting an additional ray into the stored image data in accordance with the stored rotation, scaling, and translation, determining the corresponding pixel values of the stored image data, and displaying the determined pixel values in the projected additional polygon without shading.

19. An apparatus for presenting a three dimensional image presentation on a two dimensional display, the apparatus comprising:

an image data memory means for storing image data indicative of a three dimensional volume;

a means for defining a plurality of interconnected polygons which taken together define a subregion of the three dimensional volume;

an image processor means for displaying the polygons on the two dimensional display means having a two dimensional array of pixels;

a control means for controlling the image processor to create the appearance of at least one of rotating, scaling, and translating the displayed polygons by operating on the polygons with at least one of translation, scaling, and rotation algorithms;

a storing means for storing a record of the at least one of the translation, scaling, and rotation;

an image data accessing means operatively connected with the storing means, the image data memory means, and the image processor means for projecting from each pixel within the displayed polygons into the three dimensional volume indicative image data in accordance with the stored translation, scaling, and rotation record, to identify a corresponding three dimensional image data value, and providing the identified three dimensional image data value to the video processor for producing a corresponding display at the corresponding pixel of the two dimensional display means.

20. The apparatus as set forth in claim 19 further including a comparing means for comparing three dimensional image data values with a preselected criteria, the comparing means being operatively connected with the image data accessing means such that the image data accessing means continues to project into the three dimensional image data along a viewing direction until a three dimensional image value is retrieved that meets the criteria.

21. The apparatus as set forth in claim 19 further including a shading means for altering each retrieved three dimensional image data value with shading values to provide a more three dimensional appearance to the two dimensional display.

22. A method of generating three dimensional image presentations, the method comprising:

identifying polygons which mark surface boundaries of a subregion of interest;

projecting up coordinates of the polygons and image data from the subregion of interest onto a viewing screen, which viewing screen has a rectangular array of pixels on which an image of the three dimensional data and the polygons are displayed;

rotating the polygon to select a new direction for viewing the subregion of interest;

from only pixels within the rotated polygons, projecting down to the subregion of interest along the selected new direction to select corresponding image data.

* * * * *